United States Patent [19]

Albright

[11] 4,220,119
[45] Sep. 2, 1980

[54] PET-HANDBAG CARRIER COMBINATION

[76] Inventor: D. Janine Albright, 1687 Chateau Ave., Anaheim, Calif. 92802

[21] Appl. No.: 934,379

[22] Filed: Aug. 16, 1978

[51] Int. Cl.³ ............................................. A01K 1/00
[52] U.S. Cl. ........................................ 119/19; 119/15
[58] Field of Search ................. 119/15, 19; 150/52 F; 190/43; 206/45.17; 312/117, 273, DIG. 33; D7/82

[56] References Cited

U.S. PATENT DOCUMENTS

| | | | |
|---|---|---|---|
| D. 68,728 | 11/1925 | Murphy | 312/117 X |
| 642,108 | 1/1900 | Gilbert | 190/51 X |
| 2,079,458 | 5/1937 | Leichtfuss | 119/19 X |
| 2,213,821 | 9/1940 | McCurdy | 190/51 |
| 2,244,091 | 6/1941 | Wein | 190/51 X |
| 2,519,490 | 8/1950 | Miller | 312/DIG. 33 |
| 2,897,781 | 8/1959 | Olson | 119/15 X |
| 3,195,506 | 7/1965 | Beard | 119/19 |

FOREIGN PATENT DOCUMENTS

| | | | |
|---|---|---|---|
| 178956 | 4/1962 | Sweden | 312/DIG. 33 |
| 1174234 | 12/1969 | United Kingdom | 190/43 |

Primary Examiner—Louis G. Mancene
Assistant Examiner—Robert P. Swiatek
Attorney, Agent, or Firm—Martin E. Gerry

[57] ABSTRACT

A pet-handbag carrier combination has a lower compartment with two oppositely disposed generally rigid sides. A swivable gate is provided integral with one of the sides of the carrier. The carrier also has an upper compartment with two swivable sections attached to the lower compartment. A window may be provided in one of the rigid sides generally consisting of a screen mesh to enable air to circulate for the pet within the lower compartment and to provide visibility for the pet. A removable transportation strap or handle may be attached to locations provided for such near the ends of the upper compartment.

10 Claims, 5 Drawing Figures

U.S. Patent  Sep. 2, 1980  4,220,119
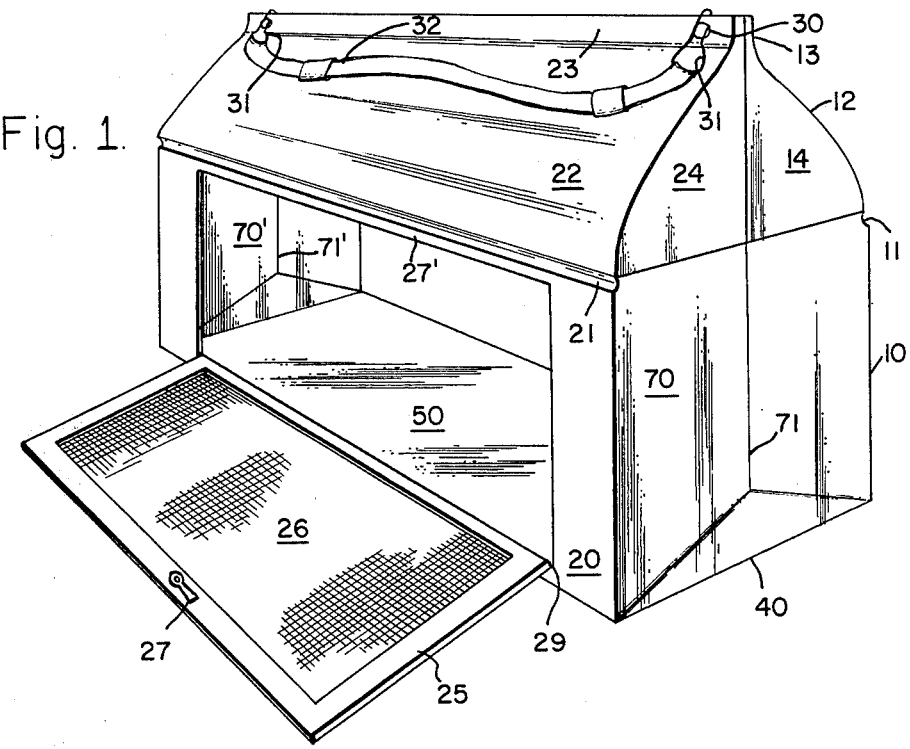
Fig. 1.
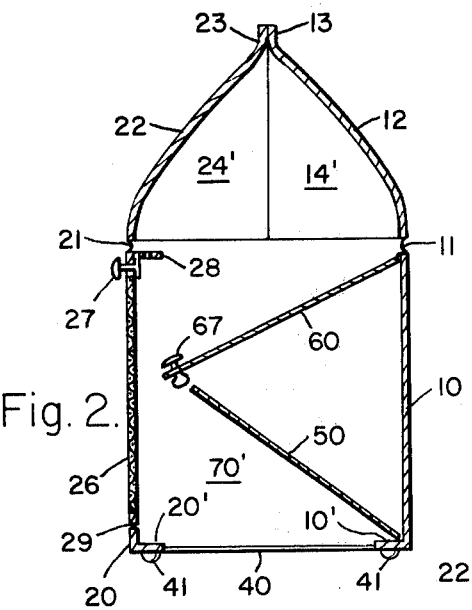
Fig. 2.
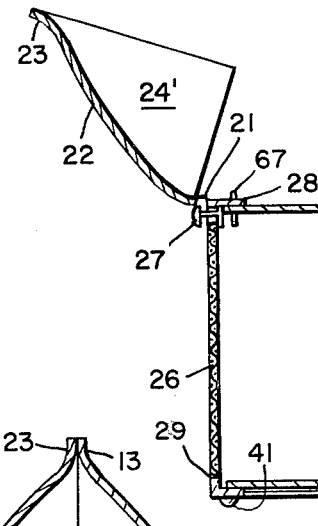
Fig. 3.
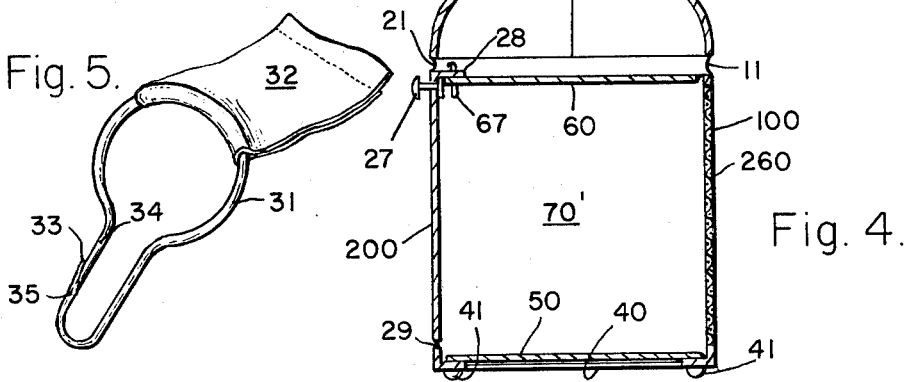
Fig. 5.
Fig. 4.

PET-HANDBAG CARRIER COMBINATION

BACKGROUND OF THE INVENTION

This invention is in the field of transportable pet carriers.

Pet carriers generally are of stiff rectangular shape with apertures dispersed therein for enabling the pet or animal therein to breathe. Such carriers are cumbersome to handle and do not provide sufficient visibility, air and comfort to the animal or pet being transported, which often results in psychologically deleterious and claustrophobic syndrome effects upon the pet due to such manner of transportation.

Prior art pet carriers also do not have the feature of having both a pet transportation compartment and a handbag compartment for providing accessories for the pet or for the person transporting the pet.

SUMMARY OF THE INVENTION

An objective of this invention is to provide a pet carrier which is easy to handle and has a window therein so that the pet being transported will not feel closed in, and additionally will have sufficient air and be relatively comfortable during its transportation.

A further objective of this invention is to provide a pet carrier that can be collapsed when not in use so that it can be stored easily in a relatively small amount of storage space.

A still further objective of this invention is to provide a pet carrier in which two compartments are provided, one for the pet and the other for handbag type accessories of the person transporting such pet or accessories usable by the pet, such as a leash, temporary food rations and the like.

Accordingly, a pet-handbag carrier is provided having a lower compartment which has two oppositely disposed generally rigid sides. Such lower compartment has two oppositely disposed ends integral with the sides and generally orthogonal to the sides. Each of the sides is larger in area than either of the ends. A swivable gate integral with one of the sides is secured to one of the sides. The gate extends over most of the area of the side in which it is located, and such gate is larger in area than either of the ends. An upper compartment is attached to the lower compartment and is comprised of two swivable sections. The swivable gate has a window therein which is generally a screen mesh. Such window extends over most of the gate area and is larger in area than any one of the ends. The lower compartment includes a resilient base integral with the sides, and has a rigid floor portion pivotably attached to one of the rigid sides that is contiguous to the base. Another rigid floor portion is pivotably attached to one of the rigid sides and contiguous to one of the swivable sections for providing a base for the upper compartment. Each of the swivable sections of the upper compartment has a lip and means therein for enabling transportation of the carrier. Within the lower compartment is a ledge integral with the side having the gate therein for securing the rigid floor portion comprising the base of the upper compartment. Another variation of the carrier includes the screen window in the side of the lower compartment which does not have the swivable gate, for preventing damage to the material of the screen mesh of the window.

BRIEF DESCRIPTION OF THE DRAWINGS

FIG. 1 is a perspective view of the pet carrier and handbag combination in accordance with the invention, showing a side of the carrier with an open gate which has a window therein.

FIG. 2 is a cross section view of the carrier of FIG. 1 with the floor platforms of the pet and handbag compartments in partially collapsed positions.

FIG. 3 is a cross section view of the carrier of FIG. 1 with the floor platforms of the pet and handbag compartments in their uncollapsed and usable positions.

FIG. 4 is a cross section view of the carrier of FIG. 1, except that the window is in an opposite non-opening side of the carrier.

FIG. 5 is a perspective view of a portion of a carrying strap arrangement shown in FIG. 1 to show details of the carrier hook and part of the carrier strap.

DETAILED DESCRIPTION

Referring to FIGS. 1-3 and 5, the pet-handbag combination may be seen in its usable mode in FIG. 1 ready to permit the pet to enter through a door-window-gate arrangement provided in one of its sides.

The carrier has one side 10 generally of stiff material such as plastic, fiberglass or other synthetic material. Integral with side 10 and attached thereto by a molding process or the like, is a hinge 11 of pliable soft material such as a plastic connected or attached to curved portion 12 comprising one rigid side of the handbag compartment. Portion 12 terminates in a sturdy lip as at 13 which is part of the closure means for the handbag part of the carrier. One end 14, orthogonal to side 10, provides end closure means of one part of the handbag compartment. Opposite to end 14 and parallel thereto is a complementary end 14' providing the same function as end 14.

The carrier has another side 20, parallel to side 10, which also has a hinge 21 of soft and pliable synthetic material integral therewith to which is attached the other curved portion 22 of the handbag compartment and terminating in a sturdy lip as at 23. One end 24, orthogonal to side 20, provides end closure means of the other part of the handbag compartment. Opposite to end 24 and parallel thereto is a complementary end 24' providing the same function as end 24.

Accordingly, the handbag compartment can be readily opened by pivotal type translation of the two compartment portions at hinges 11 and 21 respectively.

Side 20 has a tailgate type window structure integral therewith and attached by means of hinge 29 to the body of side 20, hinge 29 being of the same structure as hinge 21. Such tailgate window comprises a frame portion 25 of rigid synthetic material with a window 26 therein which window may be a grill of nylon or other fibers molded or otherwise attached to frame 25. Frame 25 has a pivotable closure device 27 attached thereto so that when the tailgate window is closed, it will engage with the upper edge 27' of side 20.

Ledge 28 is provided of rigid plastic material that is attached or integral with side 20 and generally running most of the length of the carrier within such carrier at the boundary between the lower and upper compartments of the carrier.

Hence, when the tailgate window is closed, and the pet within the carrier lower compartment, such pet may look out of the carrier on to the outside world and also enjoy the large quantity of air being supplied through grill 26. The tailgate window is conveniently opened and closed by virtue of a hinge 29, similar to hinge 21, which may also be made of soft plastic material.

The carrier is normally carried by means of an adjustable strap attached to lips 13–23. An aperture 30 is provided at each side of lips 13 and 23 so that hooks 31, having the ends of adjustable length strap 32 attached thereto, may be inserted by inserting ends 33 of hooks 31 into apertures 30 and closing hooks 31 by having ends 34 thereof seated into recess portions 35 of the hooks.

The carrier has a base portion 40, generally of soft synthetic material to enable the carrier to be collapsed, which base portion is attached to extensions 10′ and 20′ of sides 10 and 20 respectively. Extensions 10′ and 20′ are rigid right angular shaped portions. Feet 41 for the carrier may be of metal or plastic and are generally attached to extensions 10′ and 20′.

A swivable flooring member 50 is attached to extension 10′ by a hinge similar to hinge 11 so that when member 50 is parallel to the base portion 40, it is supported by extension 20′ and forms a strudy floor upon which the pet can sit, stand or recline.

Likewise, swivable member 60 is attached to side 10 by means of a hinge similar to hinge 11 and when in a horizontal position, parallel to base member 40, it is engaged by means of a swivable closure member 67 mounted thereon, engaging in a slot, not shown, in ledge 28. In this position, the top or handbag compartment is provided with a floor to enable its use independent of the pet carrier compartment below it. Such upper compartment can store accessories for the pet or serve as a handbag for the owner's or tranporter's convenience during transportation of the pet.

The pet carrier has end portions 70 and 70′ at opposite ends thereof which are of soft pliable material and are attached by a molding process or otherwise to sides 10 and 20. Such ends will generally fold at fold lines such as exemplified by lines 71 and 71′ when the carrier is collapsed.

Referring also to FIG. 4, this figure represents a cross section view of the same carrier combination as in the other figures, except that the tailgate thereof at 200 does not have the grill such as 26 therein. Instead, such grill represented by numeral 260 is in side 100, opposite to side 200, so that when the tailgate is opened, the pet will walk upon a solid and rigid surface without a grill member in it thus preventing grill damage by the pet. The grill being in side 100 which is always closed, will result in a more reliable and sturdy pet and handbag carrier.

What is claimed is:

1. A pet and handbag carrier, comprising the combination of:
    a lower compartment having two oppositely disposed generally rigid sides and two oppositely disposed ends integral with said sides and generally orthogonal with said sides, each of said sides being larger in area than either of said ends;
    a swivable gate integral with one of said sides, said gate extending over most of the area of said one of the sides and being larger in area than either of said ends, said gate constituting means for visual communication, ventilation and access by said pet to said lower compartment; and
    an upper compartment having two swivable sections integral with the lower compartment.

2. The invention as stated in claim 1, wherein said swivable gate has a window therein, said window being larger in area than the area of one of said ends.

3. The invention as stated in claim 2, wherein said window is a screen mesh.

4. The invention as stated in claim 1, wherein said lower compartment has a resilient base integral with said sides.

5. The invention as stated in claim 4, including a rigid floor portion pivotably attached to one of the sides contiguous to said base.

6. The invention as stated in claim 1, including a rigid floor portion pivotably attached to one of the sides contiguous to one of said swivable sections, said floor portion providing a base for the upper compartment.

7. The invention as stated in claim 6, including a member attached to one of said sides to a surface thereof within the lower compartment for securing said rigid floor portion to said member during transporting mode of the carrier.

8. The invention as stated in claim 1, wherein each of said swivable sections has a lip and means therein for facilitating transportation of said carrier.

9. The invention as stated in claim 1, including a window in one of the sides, the side having said window therein being opposite to the side having the swivable gate, said window being larger in area than the area of one of said ends.

10. The invention as stated in claim 9, wherein wherein said window is a screen.